(12) United States Patent
Niesner

(10) Patent No.: US 11,738,524 B2
(45) Date of Patent: Aug. 29, 2023

(54) METHOD FOR IDENTIFYING A FIBER-REINFORCED PLASTIC COMPONENT, AND A RESIN TRANSFER MOLDING (RTM) MOLD

(71) Applicant: Bayerische Motoren Werke Aktiengesellschaft, Munich (DE)

(72) Inventor: Bruno Niesner, Essenbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 326 days.

(21) Appl. No.: 16/680,123

(22) Filed: Nov. 11, 2019

(65) Prior Publication Data

US 2020/0079037 A1 Mar. 12, 2020

Related U.S. Application Data

(63) Continuation of application No. PCT/EP2018/056513, filed on Mar. 15, 2018.

(30) Foreign Application Priority Data

May 24, 2017 (DE) ...................... 10 2017 208 869.9

(51) Int. Cl.
*B29C 70/48* (2006.01)
*B29C 70/54* (2006.01)
(Continued)

(52) U.S. Cl.
CPC ............ *B29C 70/48* (2013.01); *B29C 70/548* (2013.01); *B29C 70/443* (2013.01); *B29C 70/547* (2013.01);
(Continued)

(58) Field of Classification Search
CPC .............. B29C 70/443; B29C 37/0025; B29C 2037/80; B29C 2037/0046; B29C 2037/0042; B29C 43/20; B29C 70/548
(Continued)

(56) References Cited

U.S. PATENT DOCUMENTS

| 2003/0003828 A1* | 1/2003 | Ellison .................. B29C 70/086 |
|---|---|---|
| | | 442/268 |
| 2004/0103974 A1* | 6/2004 | Majumdar ............ B60C 13/001 |
| | | 156/110.1 |

(Continued)

FOREIGN PATENT DOCUMENTS

| CN | 102622640 A | 8/2012 |
|---|---|---|
| CN | 106217909 A | 12/2016 |

(Continued)

OTHER PUBLICATIONS

English Translation of DE102011119223 (Year: 2013).*

(Continued)

*Primary Examiner* — Hana C Page
(74) *Attorney, Agent, or Firm* — Crowell & Moring LLP

(57) ABSTRACT

A method for identifying a fiber-reinforced plastic component includes the acts of providing a fiber preform, applying a label to the fiber preform and holding it in place, inserting the preform together with the label in a mold and closing the mold, and infiltrating the preform with a plastic compound and curing it in the closed mold. In order to reliably identify the plastic component, the label comes to rest on a flow aid portion formed on the inner mold wall which has at least one channel-shaped depression. The longitudinal extension of the flow aid portion projects beyond the label.

10 Claims, 3 Drawing Sheets

(51) Int. Cl.
    *B29C 70/44* (2006.01)
    *B29C 33/42* (2006.01)
(52) U.S. Cl.
    CPC ... *B29C 2033/422* (2013.01); *B32B 2260/046* (2013.01)
(58) Field of Classification Search
    USPC .......................................................... 264/257
    See application file for complete search history.

(56) References Cited

U.S. PATENT DOCUMENTS

| | | | | |
|---|---|---|---|---|
| 2008/0044506 | A1* | 2/2008 | Zahlen | B29C 70/548 425/130 |
| 2016/0136905 | A1* | 5/2016 | Filsinger | B29C 70/547 264/511 |

FOREIGN PATENT DOCUMENTS

| | | |
|---|---|---|
| DE | 199 22 850 C1 | 8/2000 |
| DE | 10 2007 013 987 A1 | 2/2008 |
| DE | 10 2011 111 452 A1 | 2/2013 |
| DE | 10 2011 119 223 A1 | 5/2013 |
| EP | 1 162 058 A1 | 12/2001 |
| EP | 2 565 020 A2 | 3/2013 |
| JP | 2006-347133 A | 12/2006 |

OTHER PUBLICATIONS

Tauchi (English Translation of DE4131223). (Year: 1992).*
Chinese Office Action issued in Chinese application No. 201880016323.6 dated Jan. 6, 2021, with English translation (Sixteen (16) pages).
PCT/EP2018/056513, International Search Report dated Apr. 23, 2018 (Two (2) pages).
German Office Action issued in German counterpart application No. 10 2017 208 869.9 dated Nov. 7, 2017 (Four (4) pages).

* cited by examiner

A-A

METHOD FOR IDENTIFYING A FIBER-REINFORCED PLASTIC COMPONENT, AND A RESIN TRANSFER MOLDING (RTM) MOLD

CROSS REFERENCE TO RELATED APPLICATIONS

This application is a continuation of PCT International Application No. PCT/EP2018/056513, filed Mar. 15, 2018, which claims priority under 35 U.S.C. § 119 from German Patent Application No. 10 2017 208 869.9, filed May 24, 2017, the entire disclosures of which are herein expressly incorporated by reference.

BACKGROUND AND SUMMARY OF THE INVENTION

The invention relates to a method for identifying a fiber-reinforced plastic component and to an RTM mold.

To produce fiber-reinforced plastic components, it is sufficiently well known to use resin transfer molding (RTM method). Here, an unsaturated semifinished fiber product is inserted into a mold. The usually two-part mold represents, as a negative mold, the outer contour of the fiber-reinforced plastic component. After closing the mold, a reactive plastic compound, for example a system consisting of epoxy resin and curing agent, is injected into the cavity of the mold. During injection, the plastic compound flows through the fiber layers. Under pressure and at elevated temperature, the plastic compound cures in the mold to form the fiber-reinforced plastic component.

In order to be able to identify components during the production process, the components are provided with a code. For this purpose, it is known to use a label which is applied by means of an adhesive layer to the semifinished fiber product prior to the RTM process and is intended to be co-embedded into the resin system during the production of the fiber-reinforced plastic component.

However, this process is prone to errors. It is frequently the case that the label is not sufficiently incorporated by the resin and remains adhering in the mold upon demolding of the component. This effect occurs to an increased degree if, for reasons of good readability, the label is produced from a material which is not able to be saturated by the resin system. Since the RTM process proceeds in an automated manner, this situation is often noticed only after the event. Finding the unidentified component afterwards and subsequently identifying it involves considerable extra effort.

It is therefore the object of the present invention to specify a possibility of how fiber-reinforced plastic components can be reliably identified.

A method for identifying a fiber-reinforced plastic component is specified in which first of all a semifinished fiber product is provided. The semifinished fiber product contains at least one layer of reinforcing fibers, such as carbon, glass or aramid fibers, for example. The reinforcing fibers are preferably oriented uni- or bidirectionally. The semifinished fiber product can be present, for example, as a planar, optionally preshaped, semifinished product or can be arranged, for example, around a supporting core.

A label is applied and fixed to the semifinished fiber product. The label has a carrier material and an identifier provided on or in the carrier material. The identifier can, for example, be printed onto or imprinted into the carrier material. The fixing of the label prevents the label from being able to slide on the semifinished fiber product or from being able to be released from the semifinished fiber product during transport thereof. The label is preferably adhesively bonded to the semifinished fiber product. For this purpose, the label can have an adhesion promoter layer.

The semifinished fiber product provided with the label is inserted into the RTM mold, and the mold is closed. The semifinished fiber product is infiltrated with a plastic compound in the mold and cured in the closed mold.

According to the invention, the label comes to lie on a flow aid portion which is formed in the mold inner wall and which has at least one channel-shaped depression which projects in its length beyond the label.

The channel-shaped depression provides a flow channel through which the plastic material flows during infiltration of the semifinished fiber product. The channel-shaped depression allows the plastic compound to flow without any problems between mold and label, and the channel-shaped depression fills with the plastic compound. After curing, a web of resin remains on a part of the surface of the label such that the latter is securely fixed to the component.

The plastic compound used is a reactive resin system which, in addition to the resin and a curing agent, can contain still further ingredients. The plastic compound preferably further contains an internal release agent. The latter passes through the channel-shaped depression between label and mold and facilitates demolding.

Only a single channel-shaped depression or two or more depressions can be provided. In order to ensure that the resin flows into the depression, the latter projects in its length beyond the label. Depending on the orientation of the label, the length of the depression is thus greater than the width, the length or the diagonal of the label.

A secure fixing of the label is achieved in one embodiment in which a lattice-shaped arrangement of channel-shaped depressions is formed in the flow aid portion. The lattice-shaped arrangement is formed by a plurality of channel-shaped depressions which cross one another, preferably at right angles. Curing of the component results in a resin lattice which securely integrates the label into the component. By virtue of the channel-shaped depressions which cross one another, the filling of the lattice structure becomes largely independent of the direction of the flow front taken by the plastic compound in the mold.

The width and the arrangement of the channel-like depressions in the lattice structure (for example the distance from one another) is preferably chosen such that the channel-like depressions of the lattice-shaped arrangement cover less than 30% (percent) of the area of the label and particularly preferably less than 20% of the area of the label. Accordingly, after the formation of the fiber-reinforced component, less than 30% or less than 20% of the label is covered by the resin webs arranged in a lattice shape.

In one embodiment, there is provision that the lattice-shaped arrangement extends over an area which is at least double the area of the label. This embodiment allows a higher permissible deviation in the positioning of the label on the semifinished fiber product. In addition, the position of the label in the mold can be varied in a targeted manner in successively following RTM cycles, with the result that regions of the mold inner wall which were covered beforehand by the label are wetted again with internal release agent in the subsequent RTM cycle.

Good readability of the label in conjunction with sufficient stability of the resin webs is achieved in one embodiment by virtue of the width of the channel-like depression lying in the range from 0.2 mm to 5 mm.

The flow of the plastic material into the lattice-shaped arrangement can be further improved if the latter has, in one embodiment, a peripheral annular channel which interconnects the individual channel-like depressions.

Use can advantageously be made in the method according to the invention of a label which is formed from a nonsaturable carrier material, such as a coated paper or a plastic film, for example. The readability of such a label is clearly better than for labels which are formed from saturable carrier material.

The method allows the use of relatively large labels which have, for example, a QR code, a barcode or another machine-readable code which can contain a large amount of component-specific information.

Furthermore, the invention relates to an RTM mold having at least two mold parts which, in the closed state, enclose a cavity with their inner wall. According to the invention, the RTM mold has, in a predetermined portion of its inner wall, a flow aid portion with at least one channel-shaped depression.

If a semifinished fiber product with label applied thereto is inserted into the mold such that the label comes to lie on the flow aid portion, the channel-shaped depression creates a flow channel for the plastic compound injected in the RTM process. It is ensured that, at least in the region of the channel-shaped depression, the plastic compound flows between label and mold wall. During curing, a resin web is formed there which securely fixes the label to the fiber-reinforced component and integrates it into the latter. During demolding, the label is securely released together with the component from the mold.

The release of the label from the mold is further improved in one embodiment in which a lattice-shaped arrangement of channel-shaped depressions is formed in the flow aid portion. It can be particularly advantageous if the lattice-shaped arrangement further has a peripheral annular channel which interconnects the individual channel-like depressions.

With regard to possible further embodiments of the channel-shaped depression or of the lattice-shaped arrangement, what has been described above in relation to the method applies. The RTM mold can be used in particular for carrying out the method according to the invention.

The above-described properties, features and advantages of this invention and the manner in which they are achieved will become clearer and more clearly understandable with reference to the drawings and in conjunction with the following description of the exemplary embodiments. Where the term "can" is used in this application, it concerns both the technical possibility and the actual technical implementation.

In the text which follows, exemplary embodiments are explained on the basis of the appended drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
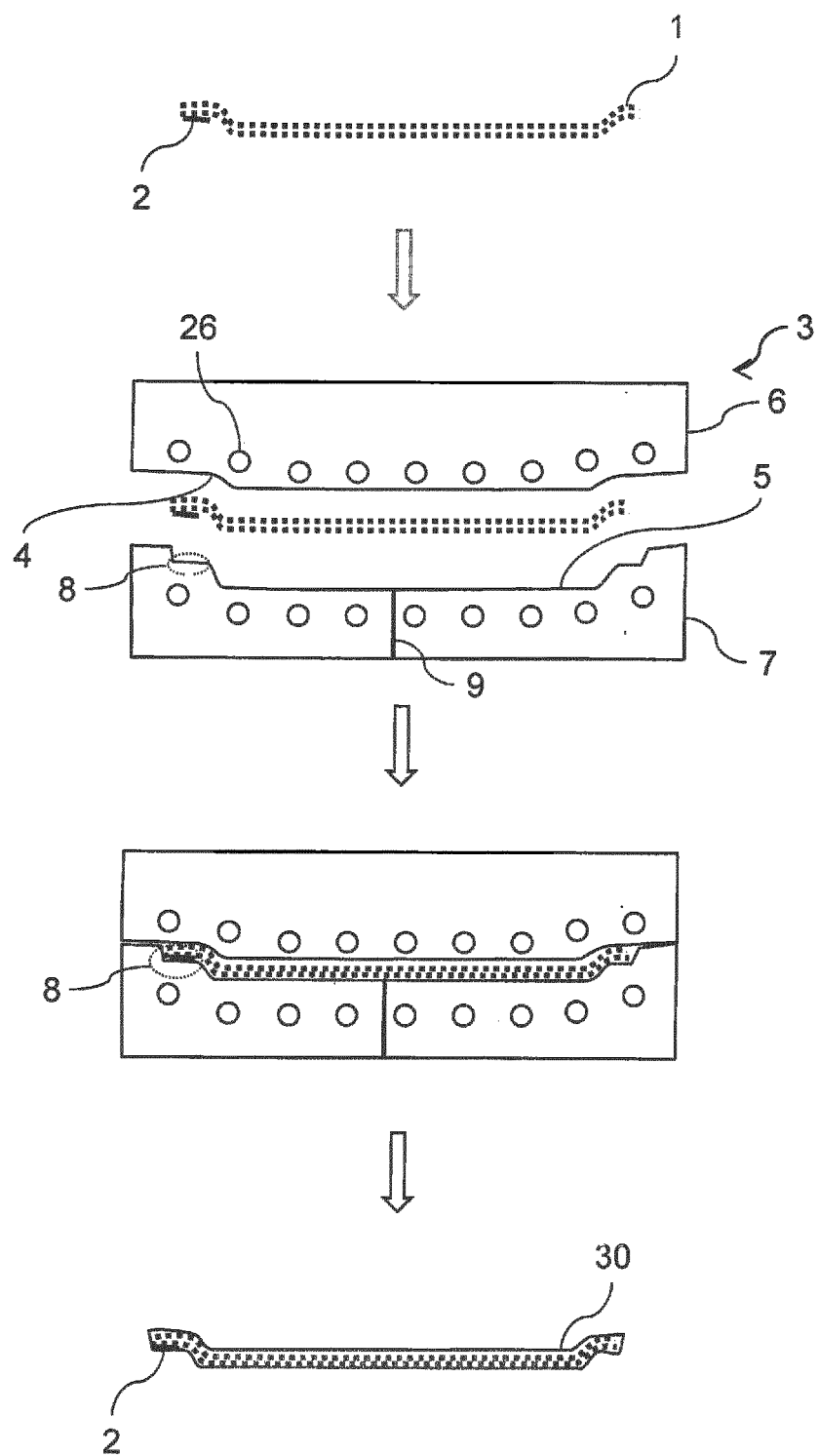
FIG. 1 shows the key method steps of a method according to the invention in a schematic view.

In the method, a semifinished fiber product 1 in the form of a prepreg is first of all provided. A label 2 is applied to the semifinished fiber product 1 and fixed there. For example, the label 2 is a sticker which is printed with a QR code and which is adhesively bonded to the surface of the semifinished fiber product 1.

The semifinished fiber product provided with the sticker is inserted into an RTM mold 3 whose cavity represents the outer contour of the fiber-reinforced plastic component to be produced. The cavity of the mold is delimited by the inner wall 4 and 5 of the mold parts 6 and 7.

The mold wall 5 is formed as a flow aid portion 8 in the region in which the label 2 comes into contact with the mold 3, for which purpose the wall has at least one channel-shaped depression which is designed to be of such length as to project beyond the label.

Figure 2:
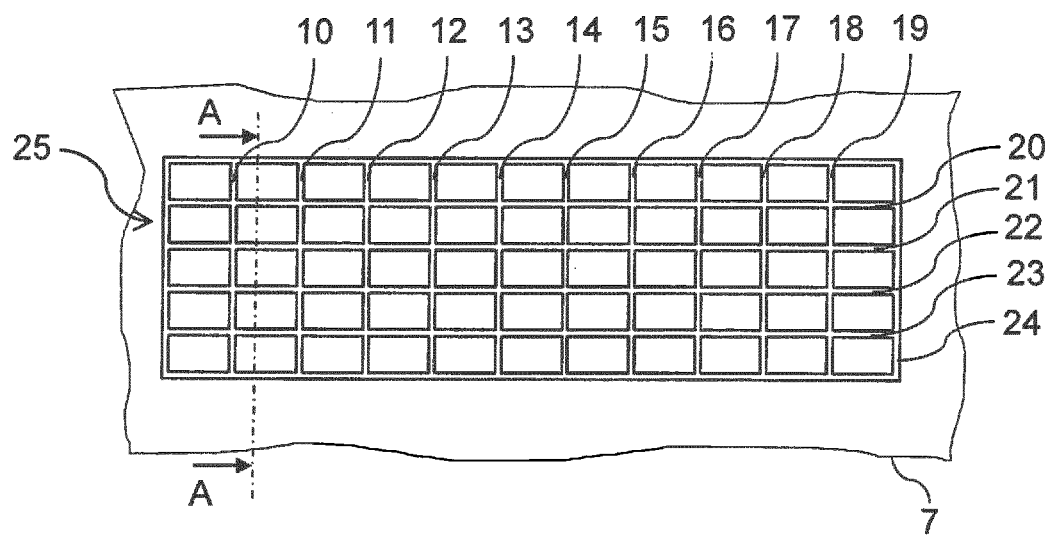
FIG. 2 shows a detail view of the flow aid portion of the RTM mold from FIG. 1 in a plan view.

FIG. 2 shows a detail view of an exemplary flow aid portion 8 in a plan view. A plurality of channel-shaped depressions 10 to 24 are formed in the mold wall 5. The depressions 10 to 23 are arranged as straight lines which intersect one another in a cross-shaped manner and form a lattice-shaped arrangement 25. The channel-shaped depressions 10 to 23 are connected peripherally by an annular channel 24.

Figure 3:
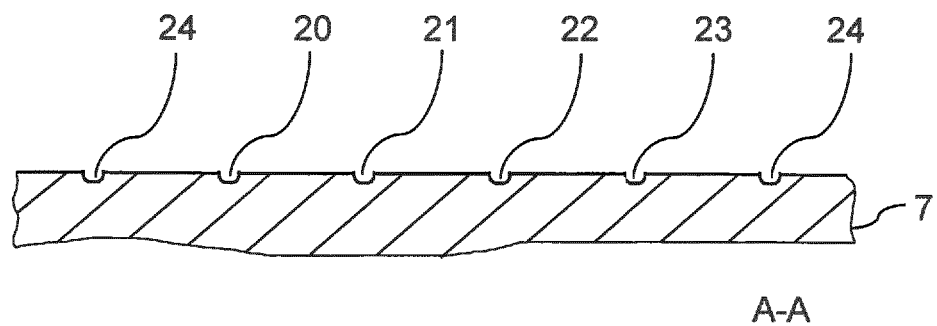
FIG. 3 shows a sectional view of the flow aid portion from FIG. 2.

The mold wall is set back in the region of the channel-shaped depressions; see the sectional view A-A of FIG. 3. If, then, a label is inserted into the RTM mold 3 and pressed against the flow aid portion 8, a hollow space between label 2 and mold wall 5 remains in the region of the channel-shaped depressions.

To produce the fiber-reinforced plastic component, a curable plastic compound, for example an epoxy resin to which a curing agent is added, is injected into the closed mold 3 by means of a filling system 9 under a pressure of up to 80 bar. The plastic compound saturates the semifinished fiber product there and fills the channel-shaped depressions in the flow aid portion.

The plastic matrix is cured and the fiber-reinforced plastic component 30 is produced by heating the RTM mold 3, for which purpose a correspondingly temperature-controlled liquid is channeled through heating tubes 26. In the region of the flow aid portion 8 there arise resin webs in the channel-shaped depressions 10 to 24 filled with plastic compound, the resin webs spanning the label 2 and securely fixing it to the component 30 and integrating it into the latter. The width and depth of the channel-shaped depressions 10 to 24 is preferably chosen such that, on the one hand, sufficient stability of the resin webs and, on the other hand, good readability of the label is ensured. It is advantageous in this respect if the width B of the channel-shaped depressions lies in the range from 1 to 5 mm. After curing, the component 30 can be demolded, with the label 2 being reliably released from the mold 3.

Figure 4:
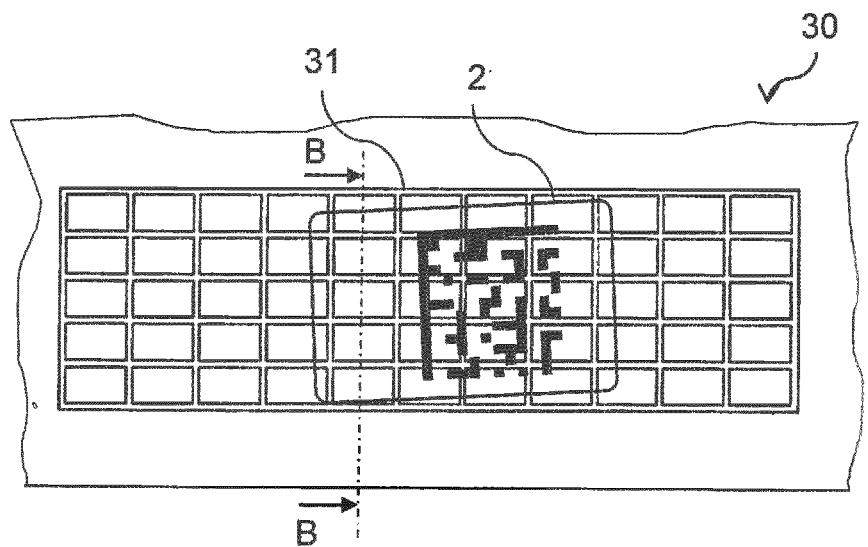
FIG. 4 shows a plan view of a label integrated into the fiber-reinforced component.

FIG. 4 shows by way of example a plan view of the fiber-reinforced component 30 with integrated label 2. The label 2 is spanned by a lattice-shaped resin structure 31, the resin structure 31 being a positive reproduction of the channel-shaped depressions 10 to 24 of FIG. 2.

Figure 5:
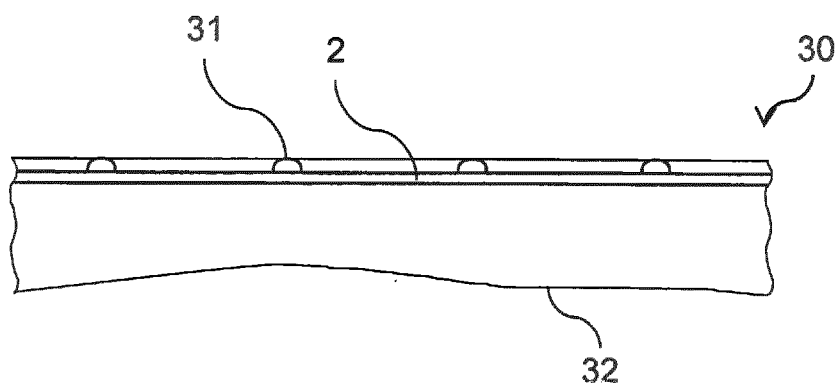
FIG. 5 shows a sectional view of the component from FIG. 4.

FIG. 5 shows a sectional view B-B of the fiber-reinforced component 30 produced by the method. The semifinished fiber product 1 incorporated into the plastic matrix is present in the main body 32. The label 2 is arranged on the surface of the main body 32 and is spanned by the resin structure 31.

The width of the channel-shaped depressions and their distance from one another in the lattice-shaped arrangement 25 are preferably chosen such that the resulting resin structure 31 covers less than 30 percent and preferably less than 20 percent of the area of the label 2. In order to allow higher tolerances in the positioning of the label, the lattice-shaped arrangement 25 preferably extends over an area which is at least double the area of the label.

The channel-shaped depressions are not limited to a certain cross-sectional shape. It is also equally possible for the channel-shaped depressions to have a curved profile instead of the rectilinear profile shown. Nor does the flow aid portion have to be formed in the lower mold, but it can also be formed in the upper mold.

The exemplary embodiments are not true to scale and are nonlimiting. Modifications within the practice of a person skilled in the art are possible.

LIST OF REFERENCE CHARACTERS

1 Semifinished fiber product
2 Label
3 RTM mold
4,5 Inner wall of the mold
6,7 Mold parts
8 Flow aid portion
9 Filling system
10 to 24 Channel-shaped depressions
25 Lattice-shaped arrangement
26 Heating tubes
30 Fiber-reinforced plastic component
31 Resin structure
32 Main body
B Width of channel-shaped depression The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for identifying a fiber-reinforced plastic component, comprising the acts of:
    providing a semifinished fiber product;
    applying a label to the semifinished fiber product;
    adhesively bonding the label to a surface of the semifinished fiber product;
    inserting the semifinished fiber product with the adhesively bonded label into a mold and closing the mold; and
    infiltrating the semifinished fiber product with a plastic compound and curing the plastic compound in the closed mold to form the fiber-reinforced plastic component;
    wherein a flow aid portion is formed on a portion of an inner wall of the mold with a lattice-shaped arrangement of channel-shaped depressions of which at least one channel-shaped depression has a length which projects beyond the label and wherein the label lies on the portion of the inner wall of the mold with the flow aid portion;
    wherein during the curing, a resin lattice is formed by the lattice-shaped arrangement which spans the label and which securely integrates the adhesively bonded label into the fiber-reinforced plastic component;
    wherein the lattice-shaped arrangement covers less than 30 percent of an area of the label or less than 20 percent of the area of the label.

2. The method according to claim 1, wherein a width of the at least one channel-shaped depression lies in a range from 0.2 mm to 5 mm.

3. The method according to claim 1, wherein the lattice-shaped arrangement has a peripheral annular channel.

4. The method according to claim 1, wherein the label is a nonsaturable carrier material.

5. The method according to claim 1, wherein the label has a QR code, a barcode or another machine-readable code.

6. A method for identifying a fiber-reinforced plastic component, comprising the acts of:
    providing a semifinished fiber product;
    applying and fixing a label to the semifinished fiber product;
    inserting the semifinished fiber product with label into a mold and closing the mold; and
    infiltrating the semifinished fiber product with a plastic compound and curing the plastic compound in the closed mold to form the fiber-reinforced plastic component;
    wherein the label lies on a flow aid portion which is formed on an inner wall of the mold with a lattice-shaped arrangement of channel-shaped depressions of which at least one channel-shaped depression has a length which projects beyond the label;
    wherein during the curing, a resin lattice is formed by the lattice-shaped arrangement which spans the label and which securely integrates the label into the fiber-reinforced plastic component;
    wherein the lattice-shaped arrangement covers less than 30 percent of an area of the label or less than 20 percent of the area of the label.

7. The method according to claim 6, wherein a width of the at least one channel-shaped depression lies in a range from 0.2 mm to 5 mm.

8. The method according to claim 6, wherein the lattice-shaped arrangement has a peripheral annular channel.

9. The method according to claim 6, wherein the label is a nonsaturable carrier material.

10. The method according to claim 6, wherein the label has a QR code, a barcode or another machine-readable code.

* * * * *